United States Patent [19]

Kamath et al.

[11] Patent Number: 5,132,823
[45] Date of Patent: Jul. 21, 1992

[54] MULTIPURPOSE LIQUID CRYSTAL DISPLAY HAVING MEANS FOR REMOVABLY POSITIONING THE RETROREFLECTOR

[75] Inventors: Hundi Kamath, Los Altos; Philip J. Jones, Menlo Park, both of Calif.

[73] Assignee: Raychem Corporation, Menlo Park, Calif.

[21] Appl. No.: 752,381

[22] Filed: Aug. 30, 1991

[51] Int. Cl.⁵ .............................................. G02F 1/13
[52] U.S. Cl. .................................................... 359/70
[58] Field of Search ............... 359/70, 71, 69, 247; 340/767; 355/43

[56] References Cited

U.S. PATENT DOCUMENTS

| | | | |
|---|---|---|---|
| 3,905,682 | 9/1975 | Meyerhofer | 359/70 |
| 4,266,859 | 5/1981 | Togashi | 359/70 |
| 4,298,249 | 11/1981 | Gloor et al. | 359/70 |
| 4,422,753 | 12/1983 | Pryor | 355/43 |
| 4,588,258 | 5/1986 | Hoopman | 359/532 |
| 4,613,207 | 9/1986 | Fergason | 359/51 |
| 4,693,560 | 9/1987 | Wiley | 359/53 |
| 4,703,999 | 11/1987 | Benson | 359/532 |
| 4,726,662 | 2/1988 | Cromack | 359/49 |
| 4,732,456 | 3/1988 | Fergason et al. | 359/51 |
| 4,775,219 | 10/1988 | Appeldorn et al. | 359/532 |
| 4,893,903 | 1/1990 | Thakar et al. | 359/70 |
| 4,991,940 | 2/1991 | Dalisa et al. | 359/70 |

FOREIGN PATENT DOCUMENTS

0421810A2 4/1991 European Pat. Off.

Primary Examiner—Stanley D. Miller
Assistant Examiner—Huy K. Mai
Attorney, Agent, or Firm—Yuan Chao; Herb Burkard

[57] ABSTRACT

A multipurpose liquid crystal display, suitable for use as a reflective display and as overhead projection panel, includes (a) a first transparent electrode means; (b) a second transparent electrode means; (c) a display medium positioned between the first and second transparent electrode means, which display medium is switchable between a first state in which incident light is scattered and a second state in which the amount of such scattering is reduced; (d) a retroreflector removably positioned behind the second transparent electrode means; and (e) means for removably positioning the retroreflector behind the second transparent electrode. Preferably, the display medium comprises positive dielectric anisotropy, operationally nematic liquid crystals dispersed in a containment medium.

25 Claims, 8 Drawing Sheets

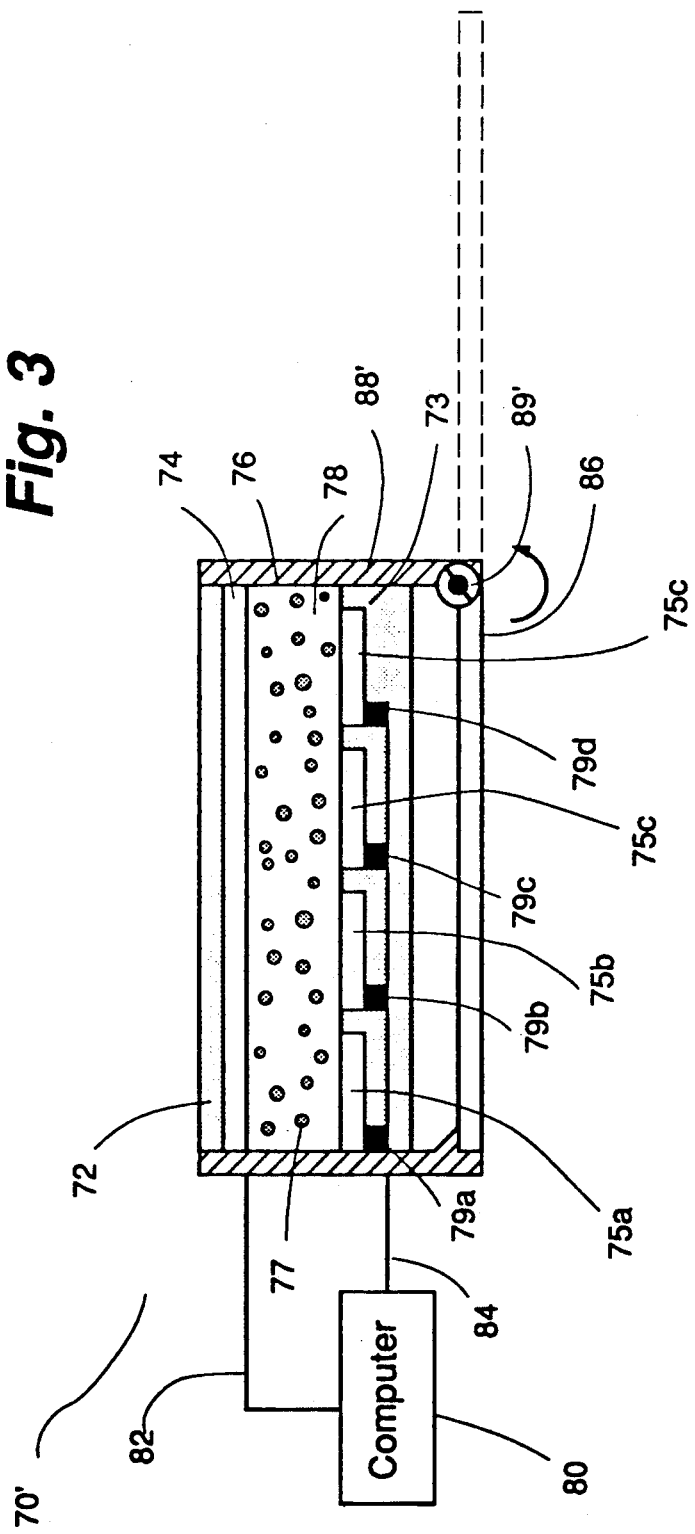

MULTIPURPOSE LIQUID CRYSTAL DISPLAY HAVING MEANS FOR REMOVABLY POSITIONING THE RETROREFLECTOR

BACKGROUND OF THE INVENTION

This invention relates to a multipurpose liquid crystal display suitable for use as a reflective display and as an overhead projector imaging panel.

Reflective liquid crystal displays, comprising a liquid crystal-based electrooptically active element placed in front of a reflector, are well known in the art. The electrooptically active element transitions between a first and a second optical state in response to an input such as an electrical signal. Light incident on the display does or does not reach the reflector depending on the optical state and accordingly is or is not reflected by the reflector, thereby providing different viewing states to the observer. Reflective liquid crystal displays find many applications, one of the most popular of which is as a computer screen in portable or "laptop" computers, on account of their light weight and low power consumption.

Recently, liquid crystal overhead projection imaging panels have become popular for displaying information, such as data, text or graphics, stored in a computer. The panel is connected to the computer, and output from the computer which would normally be directed to the computer screen is alternatively or simultaneously directed to the panel. The panel is placed directly on the overhead projector where a conventional overhead transparency would be placed, so that the computer generated images are projected by the projector onto a screen. For example, the panel can be transparent except for the dark word "HELLO" formed thereon, in which case the word "HELLO" is projected onto the screen. Such a panel provides a convenient alternative to the conventional method of printing the information onto paper, making a transparency from the paper copy, and placing the transparency on the overhead projector to project the image. Further, while the conventional method requires substantial advance preparation to generate a limited number of transparencies for projection, the panel permits the on-the-spot generation of an indefinite number of images for projection.

A preferred type of liquid crystal display employs encapsulated liquid crystal material, in which liquid crystals are encapsulated or dispersed in a matrix (or containment medium) which can be a polymer. When a voltage corresponding to a sufficiently strong electric field is applied across the encapsulated liquid crystal material (the "field-on" condition), the alignment of the liquid crystals is re-oriented in accordance with the field, so that incident light is transmitted. Conversely, in the absence of such a voltage (the "field-off" condition) the alignment of the liquid crystals is random and/or influenced by the liquid crystal-matrix interface, so that the liquid crystal material scatters incident light. The applied voltage at which the liquid crystal material begins to change from its field-off condition to its field-on condition is called the threshold voltage.

The nature of the reflector has an important effect on viewing quality. In the field-off condition, the display appears bright or paper-white, due to scattering of light towards the viewer. If a specular (mirror-like) reflector is used, good darkness can be obtained in the field-on condition, but images of objects in the room may be reflected to the viewer, producing glare, especially where there are strong point light sources such as light non-diffuse light fixtures. Alternatively, diffuse reflectors have been proposed. While reducing the aforementioned disadvantage, they have the limitation of also reducing contrast. An improved display is obtained where the reflector is a retroreflector, because a retroreflector reflects light towards the source, avoiding the glare problem associated with specular reflectors, but at the same time producing high contrast, unlike displays having diffuse reflectors. The use of retroreflectors in liquid crystal displays is disclosed in Meyerhofer, U.S. Pat. No. 3,905,682 (1975).

Thorn EMI, EP 421810 (1991), discloses a liquid crystal display having a directional reflector comprising a faceted sheet of refracting material and a layer of optically absorbing material separated from the refracting material by a substance whose refractive index is lower than that of the refracting material, for example air.

Cromack, U.S. Pat. No. 4,726,662 (1988), discloses a liquid crystal display including a prismatic lens system or a prismatic reflective system. The prismatic reflective system embodiment comprises a plurality of right-angle reflectors and light absorbing targets. Depending on whether the incident light is inside or outside the viewing cone, it is either reflected towards the targets (and absorbed thereby) or towards the viewer.

Fergason et al., U.S. Pat. No. 4,732,456 (1988), discloses a display with enhanced contrast in which a lens or reflector means is used to direct light transmitted by the display onto a light absorbing target.

Fergason, U.S. Pat. No. 4,613,207 (1986), discloses a liquid crystal projector in which an image or the characteristic of an image are created on a liquid crystal display and projected using an optical projection arrangement.

Wiley, U.S. Pat. No. 4,693,560 (1987), discloses a double layer display comprising a front and a rear liquid crystal cell, a transflector which partially reflects and partially transmits incident light disposed between the two cells, and a backlight source behind the rear cell. Under dark ambient conditions, the display operates as a backlit transmissive display. Under bright ambient conditions, the display operates as a reflective display comprising the front cell and the transflector.

Dalisa et al., U.S. Pat. No. 4,991,940 (1991), discloses a reflective liquid crystal display in which an off-set gain reflector is used to separate the directions of the gain and glare light.

SUMMARY OF THE INVENTION

This invention provides a multipurpose liquid crystal display, suitable for use as a reflective display and as overhead projection panel. Such a display comprises (a) a first transparent electrode means; (b) a second transparent electrode means; (c) a display medium positioned between the first and second transparent electrode means, which display medium is switchable between a first state in which incident light is scattered and a second state in which the amount of such scattering is reduced; (d) a retroreflector removably positioned behind the second transparent electrode means; and (e) means for removably positioning the retroreflector behind the second transparent electrode. Preferably, the display medium comprises positive dielectric anisotropy, operationally nematic liquid crystals dispersed in a containment medium.

BRIEF DESCRIPTION OF THE DRAWING(S)

FIG. 3 shows in cross-section another embodiment of a display of this invention.

Figure 4A:
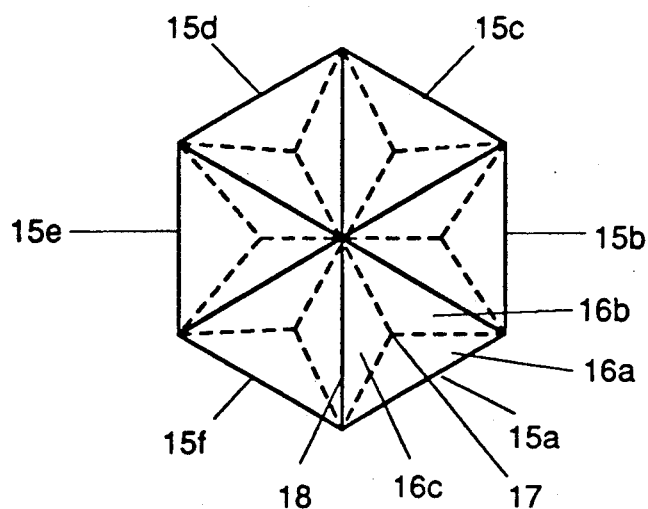
Figure 4B:
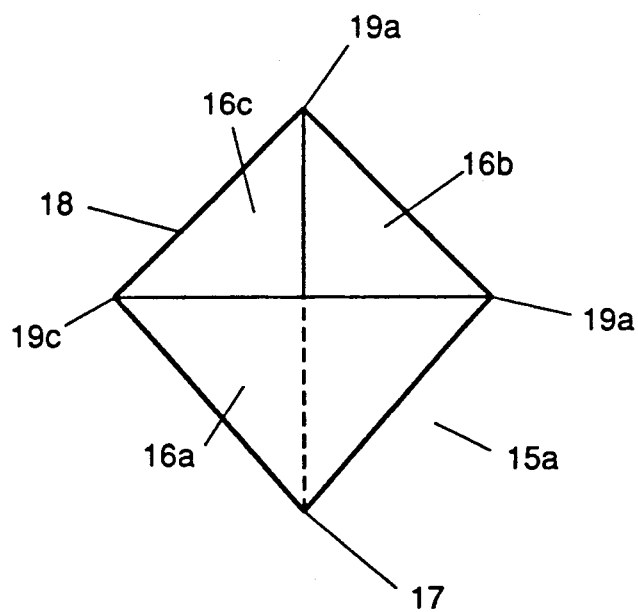

FIGS. 4a-b show an array of orthogonal corner cube elements for a retroreflector of this invention.

Figure 5:
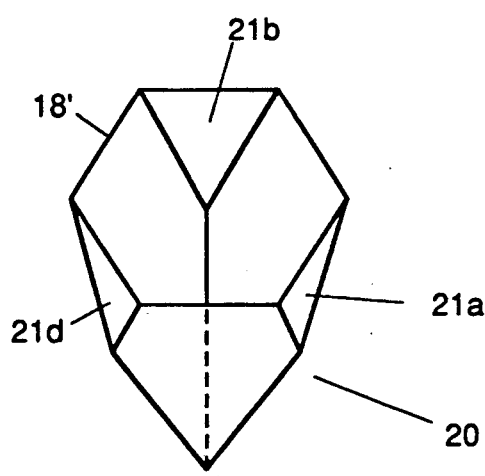

FIG. 5 shows a truncated corner cube having areas susceptible to stray reflections.

FIGS. 6a-d show various modes of operation of retroreflectors.

FIGS. 7a-b and 8a-b show how tilting the optical axis of a retroreflector leads to a display with improved contrast.

Figure 9A:
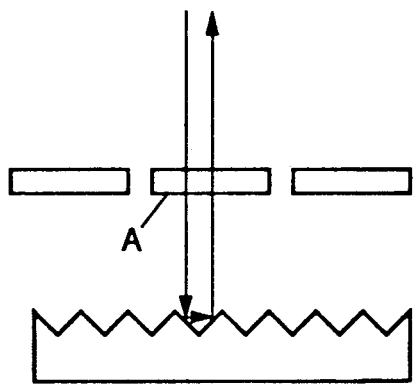
Figure 9B:
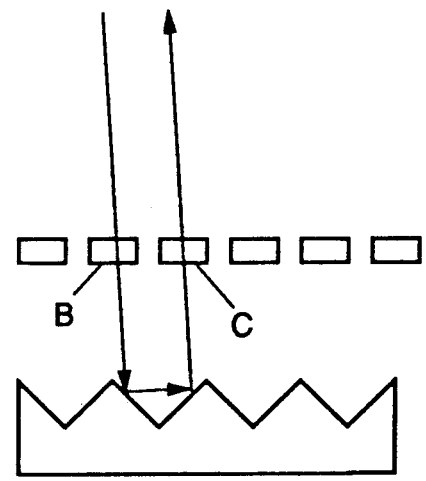

FIGS. 9a and 9b show a preferred and a less preferred combination of the relative sizes of the retroreflector elements and the pixels in a display of this invention.

DESCRIPTION OF THE PREFERRED EMBODIMENTS

A preferred display medium is encapsulated liquid crystal material, whose preparation is disclosed in U.S. Pat. Nos. 4,435,047 (1984), 4,606,611 (1986), 4,616,903 (1986) and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase, as described in Dainippon Ink and Chemicals, published European patent application EP 0,313,053 (1989). "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds. Preferably, the liquid crystals are nematic or operationally nematic. More preferably, they also have a positive dielectric anisotropy.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol) and poly(vinyl alcohol) copolymers, gelatin, polyurethane, poly(ethylene oxide), poly(vinyl pyrrolidone), cellulosic polymers, natural gums, acrylic and methacrylic polymers and copolymers, epoxies, polyolefins, vinyl polymers, and the like. Poly(vinyl alcohol) is a preferred containment medium.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

Typically, encapsulated liquid crystal material is substantially non-transparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. In those portions of the encapsulated liquid crystal material to which a sufficient electric field is applied, the transition from a non-transparent state to a transparent state occurs, while adjacent areas to which no electric field has been applied remain non-transparent.

It is known to include pleochroic dyes into the liquid crystals of the encapsulated liquid crystal material. However, for the practice of our invention it is preferred that the encapsulated liquid crystal material be substantially free of included dye, pleochroic of otherwise.

While the display medium is preferably made of encapsulated liquid crystal material, other types of scattering liquid crystal displays, for example smectic A, cholesteric, or dynamic scattering nematic displays, may also be employed.

Figure 1A:
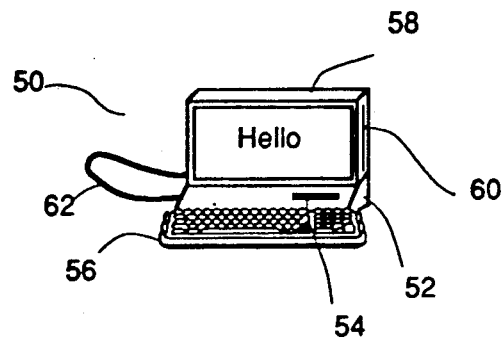
FIGS. 1a and 1b show a computer and a display of this invention.

Referring now to FIG. 1a, it shows a laptop or portable computer 50 having a central processing unit (CPU) 52 equipped with a keyboard 56 and optionally with a hard disk drive (hidden, not shown) and a floppy disk drive 54. Screen 58 is a multi-mode display and is shown in its reflective mode and positioned in the conventional position for laptop computer displays. Screen 58 is detachably mounted on computer 50 and contains a retroreflector (hidden, not shown) which can be slid in and out via slot 60. Communication between CPU 52 and screen 58 is effected via cable 62.

Figure 1B:
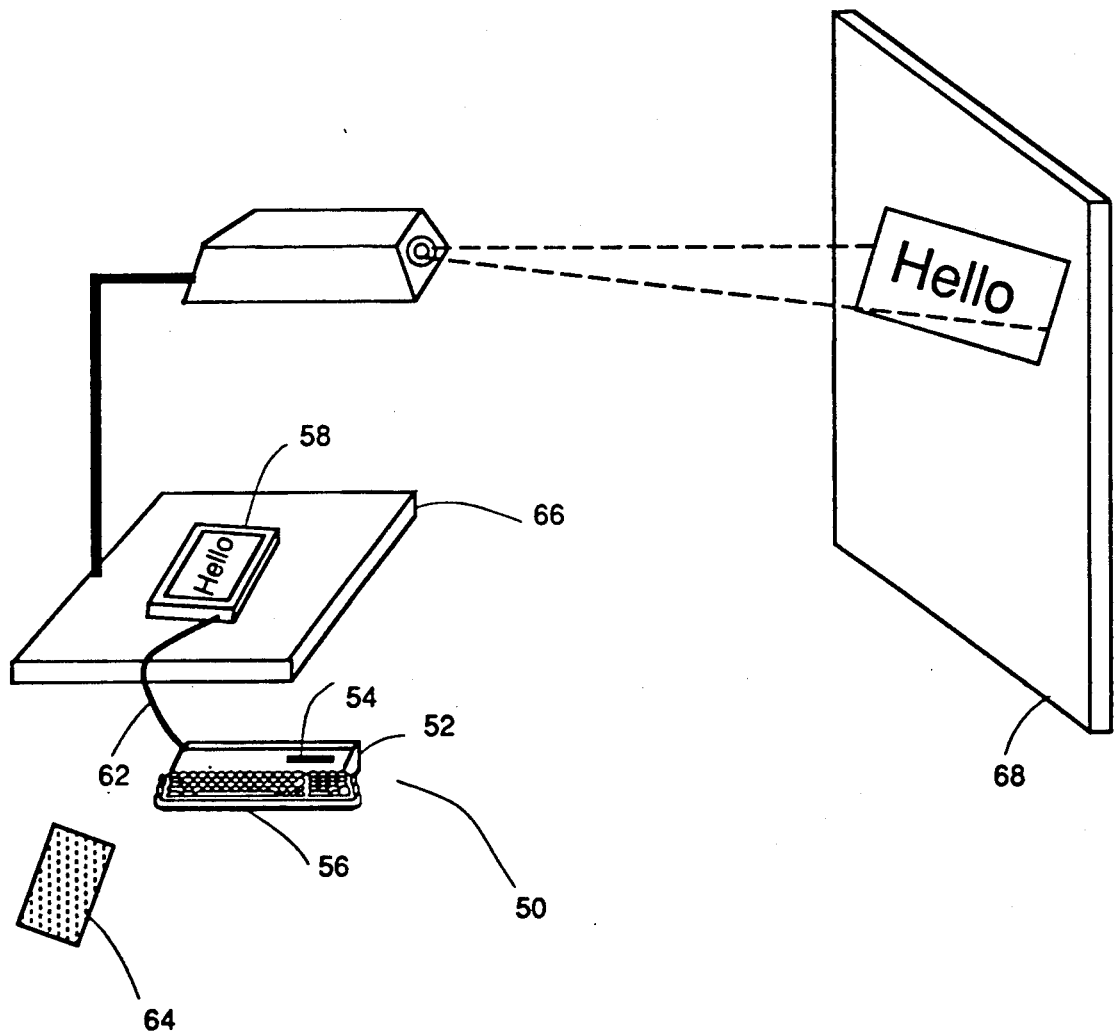

The other mode of operation of screen 58 is shown in FIG. 1b, where like numerals referring like elements. Retroreflector 64 has been slid out. Screen 58 has been detached from CPU 52 and has been placed on overhead projector 66. With the retroreflector removed, screen 58 now acts as an overhead panel, and output from CPU 52 which is displayed on screen 58 is now projected onto projection screen 68. When screen 58 is used as a reflective display screen it typically will have the portions thereof corresponding to the letters, lines, etc. of the image being display in the transparent mode, while the remaining portions will be in the scattering mode, in order to present an image of dark lettering or lines on a white background to a viewer. An image of this polarity would, when projected by an overhead projector, result in a negative image on projection screen 68—i.e., bright lettering or lines on a dark background. Since it may be desirable to project a positive image on the projection screen 68, the polarity of the image on screen 58 can be reversed as it is converted from a reflective display screen to an overhead panel. This can be done by a software command entered by the user or by a switch which senses the positioning of screen 58 and automatically reverses the image polarity when it is removed from its position atop CPU 52.

Figure 2A:
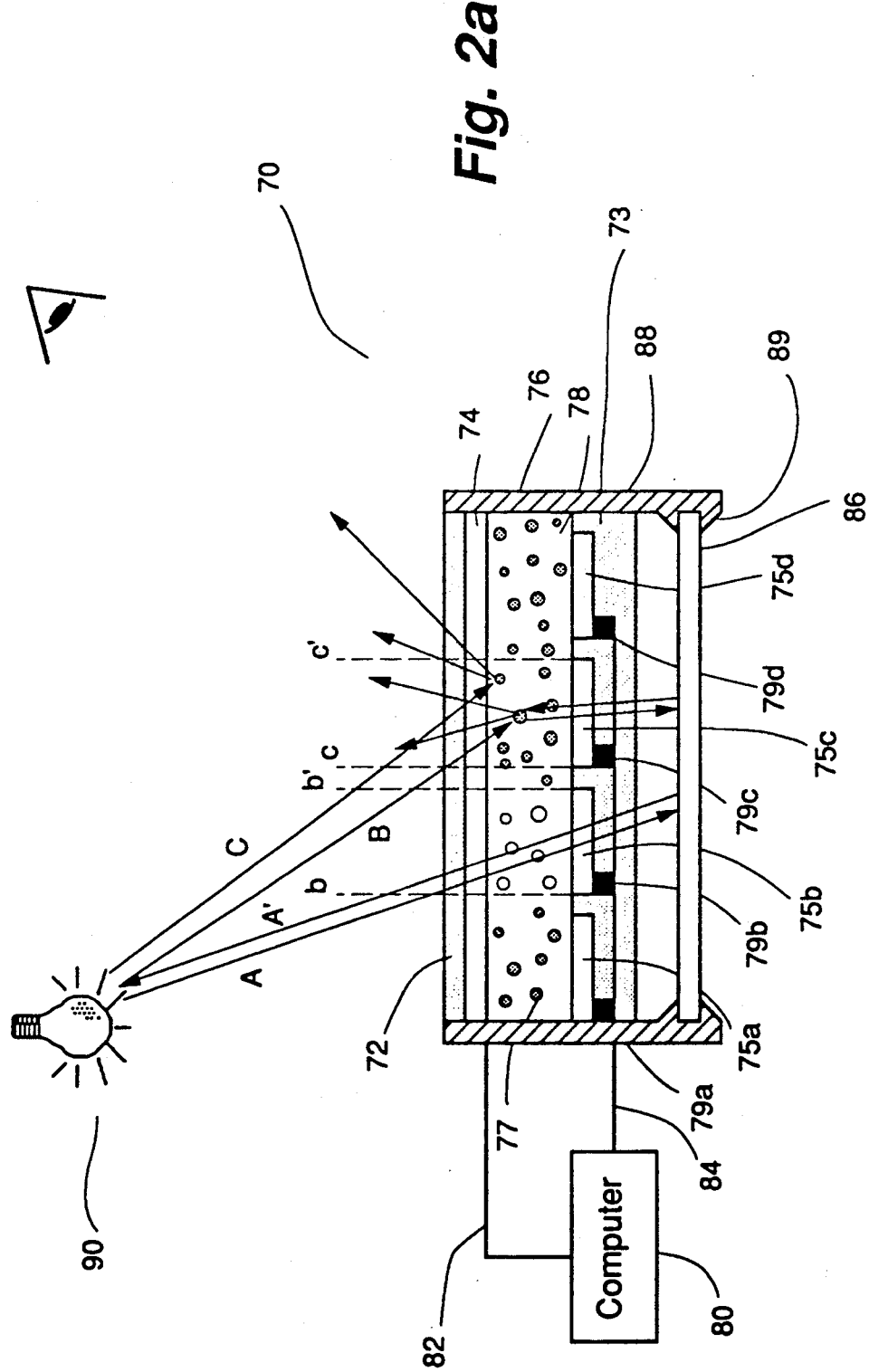
FIGS. 2a and 2b show in cross-section a display of this invention.

The construction of a multi-mode display is shown in greater detail in FIG. 2a, which depicts in cross-section the display in its reflective mode. Display 70 has top and bottom transparent supporting means 72 and 73, respectively, made of a transparent material such as poly(ethylene terephthalate) or glass and supporting between them transparent top electrode 74 and plural transparent bottom electrodes 75a-d, made of a transparent conductive material such as indium tin oxide (ITO). Display medium 76 is positioned between electrodes 74 and 75a-d and comprises a containment medium 78 having dispersed therein droplets 77 of liquid crystal. In association and electrical contact with each electrode 75a-d is a respective thin film transistor (TFT) 79a-d, for controlling the application of a voltage across top electrode 74 (which serves as a common electrode) and each bottom electrode 75a-d. A TFT acts as an insulator below a certain voltage, but as a conductor above that voltage, which is also above the threshold voltage of display medium 76. Alternatively to TFT's other switching elements such as MIM's, diodes, or varistors can be used. Computer 80 is connected to top electrode 74 and bottom electrodes 75a-d by leads 82 and 84, respectively, and controls the application of the voltage for turning each pixel of the display on or off. Retroreflector 86 is reversibly positioned behind display medium 76, bottom electrodes 75a-d, TFT's 79a-d, and bottom supporting means 73 by means of bracket 88. Retroreflector 86 is mounted onto bracket 88 by slot means 89. By sliding retroreflector 86 in and out of slot means 89, it can be reversibly moved in and out of position. Each pixel of display 70 is defined by the area of overlap between top electrode 74 and one of bottom electrodes 75a-d. For example, pixel b-b' is defined by the overlap of top electrode 74 and bottom electrode 75b, and pixel c-c' correspondingly by top electrode 74 and bottom electrode 75c. Pixel b-b' is shown in the field-on condition, that is, for the instance in which a voltage exceeding the threshold voltage has been applied to TFT 79b, while pixel c-c' (and also the other pixels, not individually identified) is in the field-off condition. Light from light source 90 which strikes display 70 at pixel b-b' (ray A) is retroreflected by retroreflector 86 (ray A'), so that light does not reach the observer from pixel b-b' and that pixel appears dark to him or her. Conversely, light from source 90 incident on pixel b-b' is either forwardly scattered (ray B) or backwardly scattered (ray C). In either instance, some of incident light is scattered towards the observer, either by a series of forward scatterings in combination with a retroreflection (ray B) or simple backscattering (ray C). Because of the diffusing nature of the scattering process, the image of light source 90 is not sharply reflected to the observer, and pixel b-b' (and the other portions of display 70 in the field-off condition) appear uniformly bright and paper-white.

Figure 2B:
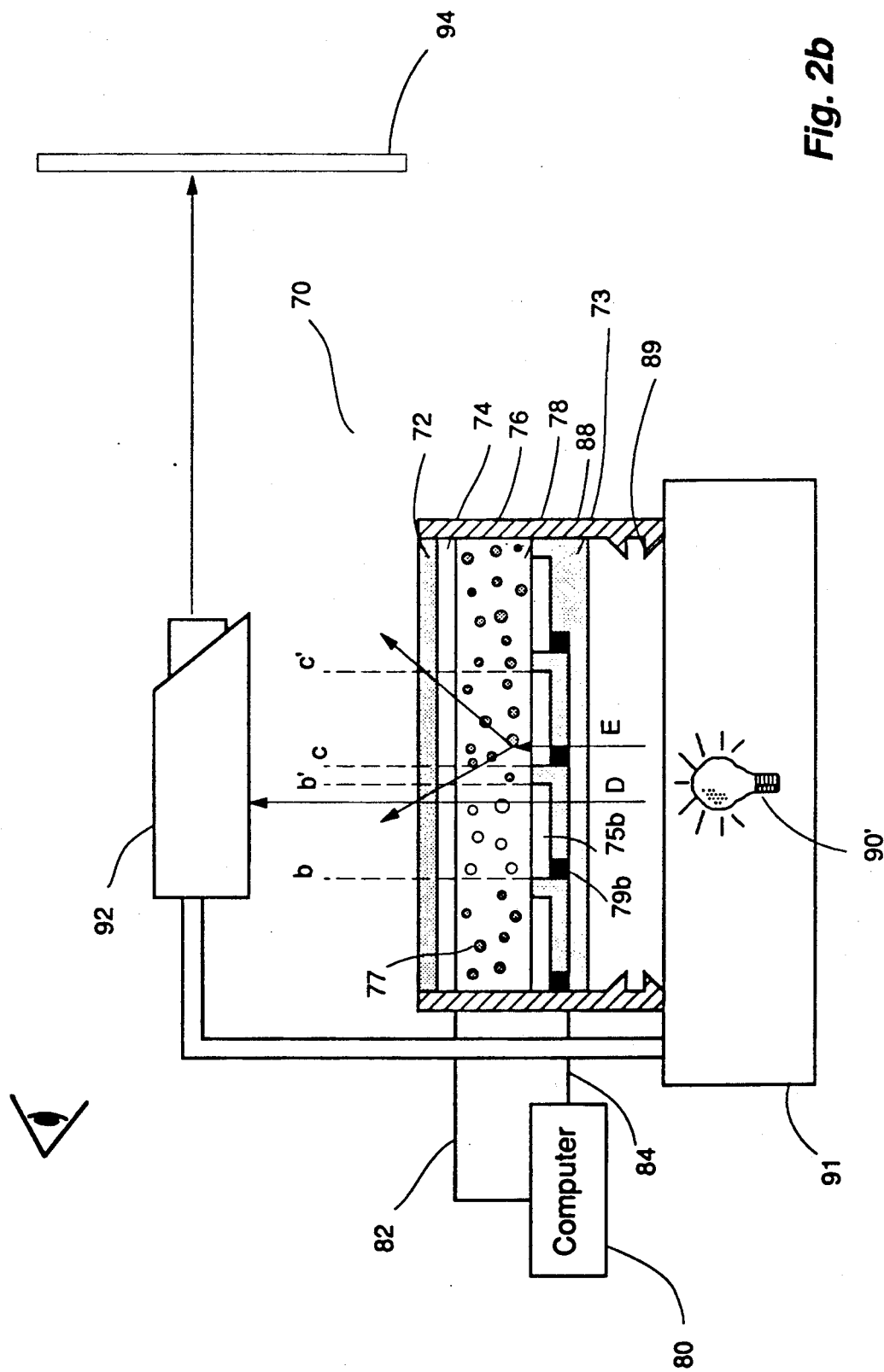

FIG. 2b shows display 70 operating in its overhead projection panel mode (like numerals referring to like elements and, for convenience, only one of bottom electrode/TFT pairs 75/79 being specifically labeled). Pixel b-b' is shown in the field-on condition, while pixel c-c' and the remainder of display 70 are shown in the field-off position. Retroreflector 86 has now been slid out of slot means 89 and display 70 has been placed onto the projection surface of overhead projector 91. Light source 90 of FIG. 2a has been replaced by projection light 90' of overhead projector 91. Light incident on pixel b-b' (ray D) is transmitted through display 70 and reaches lens housing 92 of overhead projector 91 and is then projected onto screen 94. Conversely, most of the light incident on pixel c-c' (ray E) is scattered, does not reach housing 92, and consequently is not projected.

FIG. 3 shows another embodiment of a display 70' of this invention. Display 70' differs from display 70 of FIG. 2a-b primarily in the construction of bracket 88', the other elements being essentially the same and identified by like numerals. Bracket 88', instead of having a slot means, has a hinge 89' which holds retroreflector 86 in place but permits the retroreflector to be pivoted in and out of position, to change the mode of operation of display 70'.

Alternatively to bracket 13, the retroreflector can be removably held in place by other means, such as latches, snap-in fasteners, Velcro TM fasteners, magnetic strips, and the like. Preferably, the means for holding the retroreflector permits rapid and tool-less removal and replacement of the retroreflector from and into its position behind electrooptically active element. Generally, an operator should be able to remove or reinstall the retroreflector in a minute or less with minimal effort.

A preferred method of addressing each pixel in the display is by multiplexing, because multiplexing requires a lesser number of leads than direct addressing. In multiplexing, a set of M row electrodes is used in combination with a set of N column electrodes. By applying the proper electrical signals to, for example, the 5th row and the 8th column electrodes, the pixel at the 5th row and 8th column can be switched on and off. Thus, multiplexing reduces the number of electrode leads needed for addressing a matrix of $M \times N$ pixels from $M \times N$ (in the instance of direct addressing) to $M+N$. The association of a TFT with each pixel is advantageous because it reduces cross-talk and avoids the inadvertent switching of a pixel adjacent to the one being addressed.

Basically, a retroreflector is a reflector which substantially redirects incident light back to the source largely independent of the angle of incidence—that is, the returning ray of light is substantially parallel to the incident ray. The construction of retroreflectors is disclosed for example in Rowland, U.S. Pat. No. 3,935,359

(1976); Kuney, Jr. U.S. Pat. No. 4,957,335 (1990); Nelson et al., U.S. Pat. No. 4,938,563 (1990); Belisle et al., U.S. Pat. No. 4,725,494 (1988); Appledorn et al., U.S. Pat. No. 4,775,219 (1988); Tung et al., U.S. Pat. No. 4,712,868 (1987); Malek, U.S. Pat. No. 4,712,867 (1987); Benson, U.S. Pat. No. 4,703,999 (1987); Sick et al., U.S. Pat. No. 4,464,014 (1984); Nelson et al., U.S. Pat. No. 4,895,428 (1990); Hedblom, U.S. Pat. No. 4,988,541 (1991); Schultz, U.S. Pat. No. 3,922,065 (1975); and Linder, U.S. Pat. No. 3,918,795 (1975); the disclosures of which are incorporated herein by reference. Those skilled in the art will appreciate that retroreflectors suitable for use with this invention are not limited to those specifically described therein, but that other retroreflectors can be used, mutatis mutandis.

A preferred retroreflector comprises an array of full corner cube elements and has an optic axis tilted away from the normal to the plane of the display by an angle of between about 10° and about 45°, as such a retroreflector improves the brightness and contrast of the display. By a full corner cube element, it is meant it is meant a reflective element consisting of three orthogonal reflective faces. Such corner cube elements are depicted in FIGS. 1a-b. A corner cube element may be visualized as that the three-faced pyramid produced by sectioning off a corner of a cube. Such elements can be arranged in an array, to produce a retroreflector. FIG. 1a shows in a top view a hexagonal array of six corner cube elements 15a-f. Referring to FIG. 1b, it shows in plan view representative element 15a, comprising three faces 16a-c meeting at apex 17. To prevent scattering by the top edges of the corner cube element (i.e., where an orthogonal surface of one corner cube element intersects the orthogonal surface of another corner cube element, of which edge 18 is representative), it may be desirable to ensure that they are sharp or covered with a dark, absorbing material. Further, apex 17 may be similarly treated to make it non-reflective.

Additionally, the retroreflector preferably does not produce any spurious reflections from areas thereof which are not active retroreflective surfaces. For example, in a corner cube retroreflector which does not have accurate orthogonal corner cube elements but has instead truncated corner cube elements (which may be visualized as the corner cube elements of FIGS. 1a-b with their corners sectioned off) or which has rounded edges, the non-retroreflecting areas should be masked off by coating them with an absorbing coating or placing an absorbing layer behind the retroreflector if the latter is transparent. An illustration of a truncated corner cube array and how its performance can be improved is shown in FIG. 2. Truncated corner cube element 20 can be visualized as corner cube 15a with the three corners 19a-c sectioned off, to produce new faces 21a-c. Edge 18' corresponds to edge 18 in corner cube 15a and is provided for visual reference purposes. It is noted that corner cube element 20 also has a hexagonal aspect, again permitting maximal packing efficiency. Generally, it is desired that the non-active areas of the retroreflector, i.e., those areas which are not directly active in reflecting or refracting light beams in the retroreflective process, be minimized in size and/or covered or masked with a non-reflective material.

Figure 6A:
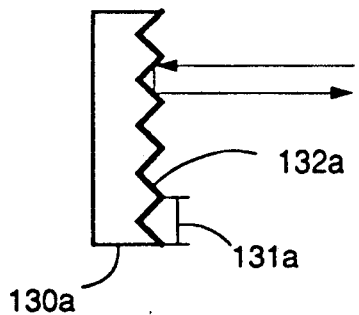
Figure 6B:
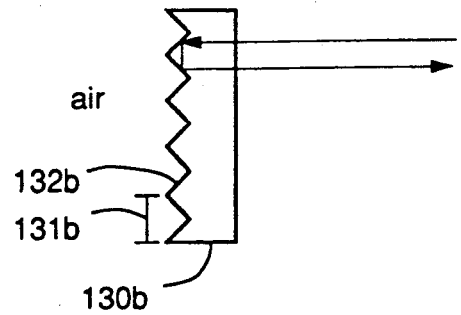
Figure 6C:
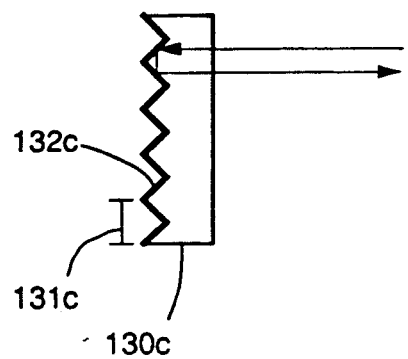
Figure 6D:
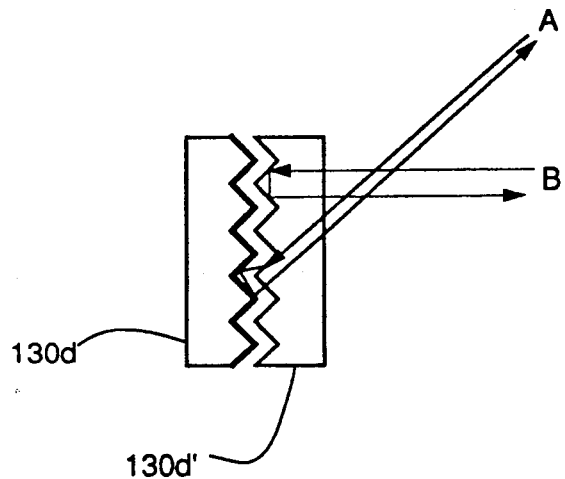

A corner cube retroreflector (sometimes also referred to in the art as a "cube corner" reflector) can operate either by the principle of total internal reflection or by simple specular reflection, or both. FIGS. 6a-d show four types of corner cube retroreflectors usable in this invention. FIG. 6a shows a front-surface retroreflector 130a made of an array of corner cube elements 131a, each having three orthogonal specularly reflective surfaces 132a, for example made by metallizing a substrate surface with aluminum, silver, gold or some other metal. Light incident on one of the orthogonal surfaces of a corner cube element 131a is reflected at each orthogonal surface 132a and thence back in the direction from which it came. (There being three orthogonal surfaces, there are a total of three reflections, but for convenience of representation in a two-dimensional drawing, only two reflections are shown in the figure.) FIG. 6b shows a rear-surface retroreflector 130b which operates by the principle of total internal reflection. Retroreflector 130b is made of a transparent material and comprises corner cube elements 131b positioned at its rear surface, i.e., away from the light source. Behind retroreflector 130b is a medium of lower refractive index, typically air. When a light ray strikes one of the orthogonal surfaces 132b of corner cube element 131b, it is reflected to another orthogonal surface 132b by the principle of total internal reflection, and, after three such reflections, back in the direction from which it came. FIG. 6c shows a rear-surface retroreflector 130c, in which the corner cube elements 131c are positioned at the rear and in which the orthogonal reflective surfaces 132c are specularly reflective as in retroreflector 30a. A more efficient retroreflector can be obtained by combining the specular and total internal reflection modes of operation. Such a retroreflector is shown in FIG. 6d. The rear half comprises a retroreflector 130d operating by specular reflection, such as previously shown in FIG. 6a. The front half comprises a retroreflector 130d' operating by the principle of total internal reflection, such as previously shown in FIG. 6b. A light which strikes retroreflector 130d' at an angle too oblique to be totally internally reflected (e.g., ray A) is refracted towards retroreflector 130d and, if striking the latter at an angle within its acceptance cone, is retroreflected thereby. Conversely, light which strike retroreflector 130d' at an angle within its acceptance cone (e.g., ray B) is retroreflected thereby. Such combination retroreflectors, which may be described as retroreflectors in which the rear surface is configured with corner cube reflective elements and a specularly reflective surface shaped as a negative of the corner cube reflective elements is placed in a closely spaced mating relationship with the rear surface, are discussed in more detail in Benson, U.S. Pat. No. 4,703,999 (1987), the disclosure of which is incorporated by reference.

Turning now to the brightness of the display in the field-off condition, it is preferred that the resultant brightness be at least 60% that of ordinary white paper. Generally, the brightness is determined by the fraction of the reflector surface which is retroreflective (assuming that the non-retroreflective areas have been masked off as described above) and the reflectivity of the retroreflecting surfaces themselves.

Figure 7A:
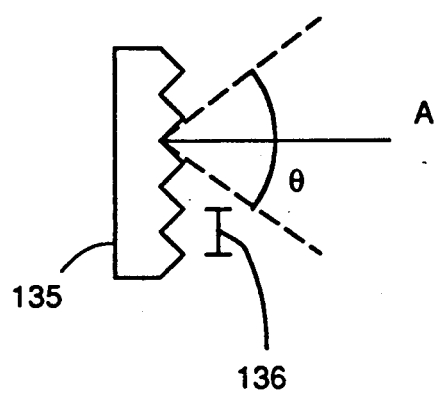
Figure 7B:
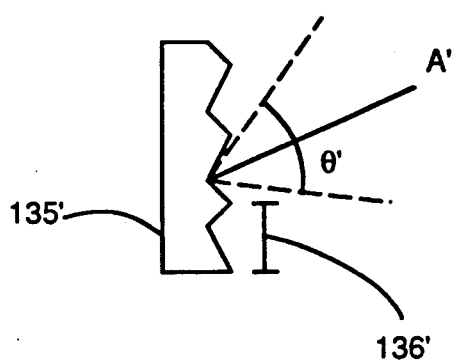

However, I have discovered that it is possible to make displays having significantly improved brightness by taking advantage of the fact that, in most rooms the light is not truly uniform, but usually directed within a ±50° cone. The fraction of light retroreflected can be maximized by tilting the optical axis by 10° to 45° of the retroreflector to match the orientation of the predominant light source, so that more of the incident light will be captured in the corner cube's acceptance cone. (The optic axis of a corner cube retroreflector is the line defined by the points equidistant from each of the three orthogonal faces.) A retroreflector with a tilted optic axis may be achieved by simply tilting each of the retroreflector elements in an array, as shown in FIGS. 7a-b. In FIG. 7a, a retroreflector 135 has an optic axis A normal to its plane ($\theta$ being its acceptance cone) as each of its retroreflecting elements 136 is oriented in a conventional manner. FIG. 7b shows a retroreflector 135' having an optic axis A' ($\theta'$ being its acceptance cone) tilted away from normal, as a result of the each of retroreflecting elements 136' being tilted. The preparation of corner cube reflectors having tilted optic axes is described in Hoopman, U.S. Pat. No. 4,588,258 (1986) and Appeldorn et al., U.S. Pat. No. 4,775,219 (1988), the disclosures of which are incorporated herein by reference.

Figure 8A:
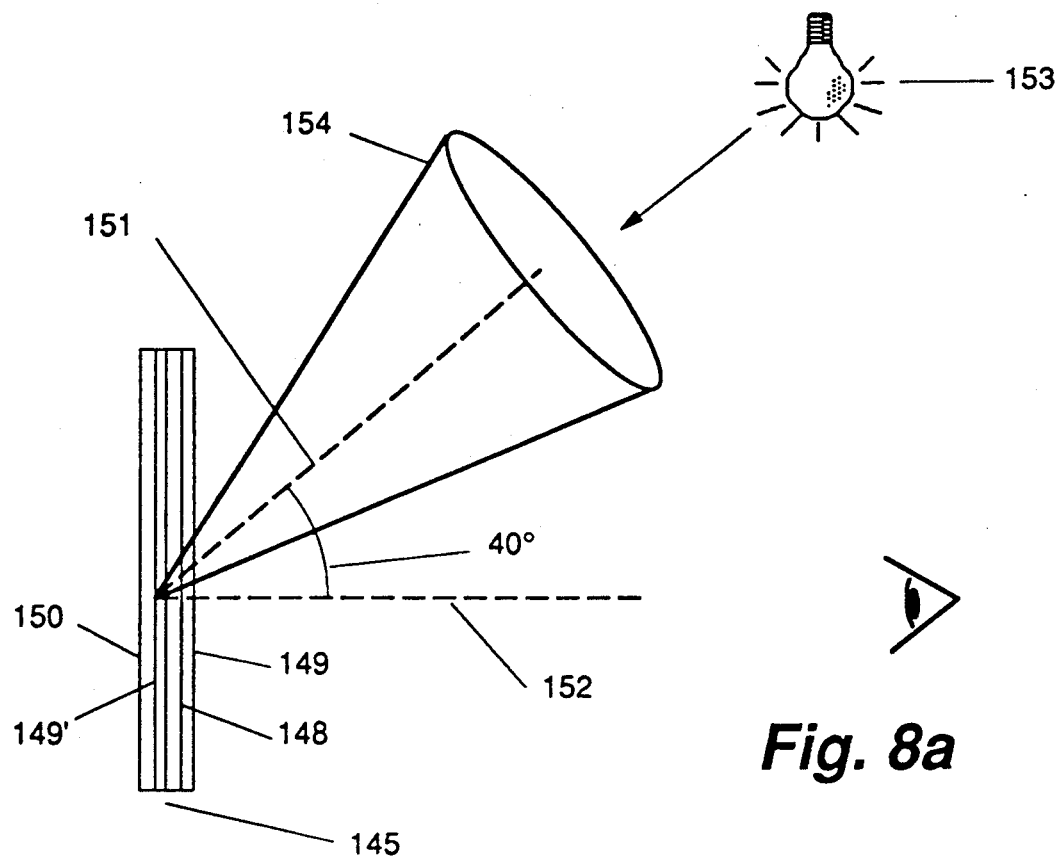
Figure 8B:
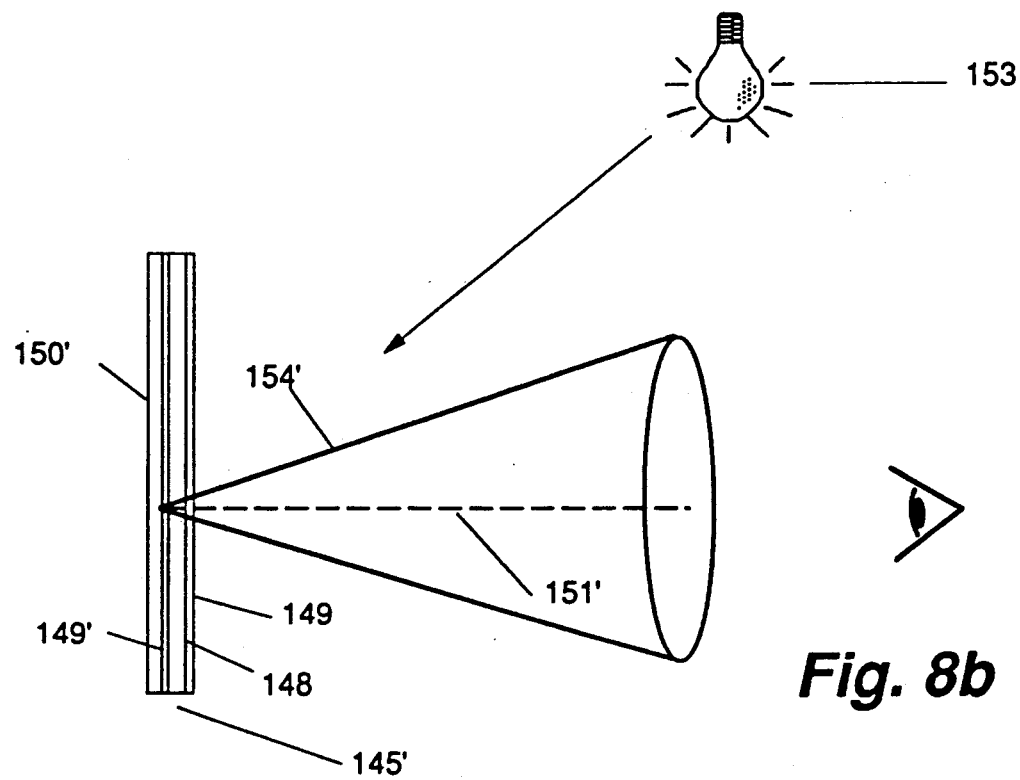

Schematically, the effect of this tilting of the optic axis is shown in FIGS. 8a-b. In FIG. 8a display 145 includes an electrooptical element 148 made of encapsulated liquid crystal material, first and second transparent electrodes 149 and 149' sandwiching electrooptical element 148, and a retroreflector 150 whose optic axis 151 is tilted upwards by about 40° from normal line 152 to the plane of display 145, towards the anticipated predominant direction from which light will impinge on the display during the course of ordinary use. Typically, the predominant light source will be a ceiling fixture 153, situated above the viewer, so that the tilt in optic axis 51 will normally be upwards. As a result, light rays from fixture 53 will largely fall within acceptance cone 154 of retroreflector 150 and be retro-reflected thereby and away from the viewer, increasing display darkness in the field-on condition. Comparison is made with display 145' of FIG. 8b (numerals identically repeated from FIG. 8a designating like elements), which is similar to display 145 of FIG. 8a, except for retroreflector 150', whose optical axis 151' is not tilted but instead is oriented in a conventional manner, normal to the plane of the display. Consequently, light rays from fixture 153 will generally fall outside of acceptance cone 154', so that they will not be retroreflected by retroreflector 150'. A significant number of the light rays will may be specularly reflected or scattered towards the viewer, decreasing display darkness in the field-on condition and consequently the contrast.

Accordingly, a preferred retroreflector combines a narrow retroreflectivity cone, of less than 6°, and a tilt in its optical axis by between 10° and 45°. For displays designed to be viewed in a substantially perpendicular orientation, the amount of tilt should be on the high side, preferably between 30° and 45°. For displays designed to be viewed while positioned horizontally, e.g., laid flat on a table, the amount of tilt can be relatively low, preferably between 10° and 20°. Further, those areas of the retroreflector which can cause spurious reflections are preferably masked off with a light absorbing material. The design and construction of such preferred retroreflectors is further disclosed in copending, commonly assigned application Ser. No. 07/752,729 of Jones, entitled "Liquid Crystal Display Having Improved Retroreflector," filed even date herewith, the disclosure of which is incorporated herein by reference.

For best results, it is desirable that the pixel pitch be greater than the pitch of the retroreflective elements in the retroreflector (keeping in mind that pixel pitch may be different in the x and y directions, and that this preference applies to both the x and y directions). The reason is that, by the nature of a retroreflector, a incident ray of light is displaced parallel (or substantially so) to its incoming path as it is redirected back towards the source. If this results in a ray of light incoming and exiting through different pixels, this may be undesirable, as illustrated in FIGS. 9a and 9b. FIG. 9a shows the more desired embodiment in which the pixel pitch is greater than the pitch of the retroreflector elements. Consequently, an incident light ray will (or at least is highly likely to) enter and exit through the same pixel, i.e. the pixel labeled A. Conversely, in FIG. 9b, the pixel pitch is smaller than the pitch of the retroreflector elements, so that an incoming ray of light may enter via pixel B but exit via pixel C. This is undesirable where pixel C has different attributes from pixel B, for example is "off" while pixel B is "on" or is green while pixel B is red. Preferably, the pitch of the retroreflector elements is a submultiple (e.g., $\frac{1}{2}$, $\frac{1}{4}$) of the pixel pitch. An alternative preferred size relationship is for the retroreflector elements to be substantially smaller than the size of the pixels and to be packed with some degree of randomness.

Generally, it is preferred that, in a reflective display, there be substantially no gap between the reflector and the bottom electrode, to minimize parallax effects. However, a slight gap is often an incident of the manufacturing process, because gapped displays are easier to manufacture. An advantage of the displays of this invention is that, because of the optical nature of a retroreflector, the display is more tolerant of the presence of a gap, without incurring undesirable parallax effects, thereby permitting greater convenience in manufacturing and product design.

What is claimed is:

1. A multipurpose liquid crystal display suitable for use as a reflective display and as overhead projection panel, comprising
    (a) a first transparent electrode means;
    (b) a second transparent electrode means;
    (c) a display medium positioned between the first and second transparent electrode means, which display medium is switchable between a first state in which incident light is scattered and a second state in which the amount of such scattering is reduced;
    (d) a retroreflector removably positioned behind the second transparent electrode means; and
    (e) means for removably positioning the retroreflector behind the second transparent electrode.

2. A display according to claim 1, wherein the means for removably positioning the retroreflector is a bracket having a slot means for sliding the retroreflector in and out.

3. A display according to claim 1, wherein the means for removably positioning the retroreflector is a bracket having a hinge to which the retroreflector is affixed and via which the retroreflector can be pivoted in and out of position.

4. A display according to claim 1, wherein the retroreflector is toollessly removable its position behind the second transparent electrode means.

5. A display according to claim 1, wherein the pixel pitch in the display medium is greater than the pitch of the retroreflective elements in the retroreflector.

6. A display according to claim 1, wherein the retroreflector comprises an array of full corner cube elements and has an optic axis tilted towards the top of the display by an angle of between about 10° and about 45°.

7. A display according to claim 6, wherein the optic axis of the retroreflector is tilted by between about 10° and about 20°.

8. A display according to claim 6, wherein the optic axis of the retroreflector is tilted by between about 30° and about 20°.

9. A display according to claim 6, wherein the retroreflector is a front surface retroreflector whose corner cube elements are specularly reflective.

10. A display according to claim 6, wherein the retroreflector is a rear surface retroreflector whose corner cube elements reflect by total internal reflection.

11. A display according to claim 6, wherein the retroreflector is a rear surface retroreflector whose corner cube elements are specularly reflective.

12. A display according to claim 6, wherein the retroreflector comprises a front half which is a rear surface retroreflector whose corner cube elements reflect by total internal reflection and a rear half which is a front surface retroreflector whose corner cube elements are specularly reflective.

13. A display according to claim 6, wherein in the corner cube elements the intersection of an orthogonal face of one corner cube element with an orthogonal face of another corner cube element are masked with a dark, light absorbing material.

14. A display according to claim 1, wherein the display medium comprises positive dielectric anisotropy, operationally nematic liquid crystals dispersed in a containment medium.

15. A display according to claim 14, wherein the means for removably positioning the retroreflector is a bracket having a slot means for sliding the retroreflector in and out.

16. A display according to claim 14, wherein the means for removably positioning the retroreflector is a bracket having a hinge to which the retroreflector is affixed and via which the retroreflector can be pivoted in and out of position.

17. A display according to claim 14, wherein the retroreflector is toollessly removable its position behind the second transparent electrode means.

18. A display according to claim 14, wherein the pixel pitch in the display medium is greater than the pitch of the retroreflective elements in the retroreflector.

19. A display according to claim 14, wherein the optic axis of the retroreflector is tilted by between about 10° and about 20°.

20. A display according to claim 14, wherein the optic axis of the retroreflector is tilted by between about 30° and about 45°.

21. A display according to claim 14, wherein the retroreflector is a front surface retroreflector whose corner cube elements are specularly reflective.

22. A display according to claim 14, wherein the retroreflector is a rear surface retroreflector whose corner cube elements reflect by total internal reflection.

23. A display according to claim 14, wherein the retroreflector is a rear surface retroreflector whose corner cube elements are specularly reflective.

24. A display according to claim 14, wherein the retroreflector comprises a front half which is a rear surface retroreflector whose corner cube elements reflect by total internal reflection and a rear half which is a front surface retroreflector whose corner cube elements are specularly reflective.

25. A display according to claim 14, wherein in the corner cube elements the intersection of an orthogonal face of one corner cube element with an orthogonal face of another corner cube element are masked with a dark, light absorbing material.

* * * * *